(12) United States Patent
Tsutsumi

(10) Patent No.: US 8,995,310 B2
(45) Date of Patent: Mar. 31, 2015

(54) COMMUNICATION MODULE

(75) Inventor: Jun Tsutsumi, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 162 days.

(21) Appl. No.: 13/472,082

(22) Filed: May 15, 2012

(65) Prior Publication Data

US 2012/0300679 A1 Nov. 29, 2012

(30) Foreign Application Priority Data

May 24, 2011 (JP) .................................. 2011-116352

(51) Int. Cl.
| H05K 1/14 | (2006.01) |
| H05K 1/11 | (2006.01) |
| H04B 7/005 | (2006.01) |
| H04B 1/18 | (2006.01) |

(52) U.S. Cl.
CPC ........................................ H04B 1/18 (2013.01)
USPC ........................................... 370/278; 361/803

(58) Field of Classification Search
CPC ..... H03H 9/542; H03H 9/725; H03H 7/0115; H03H 7/463; H03H 9/72; H03H 7/01; H03H 7/1741; H03H 7/00
USPC ........................... 370/278, 277; 361/803, 782
See application file for complete search history.

(56) References Cited

U.S. PATENT DOCUMENTS

| 4,227,156 A | 10/1980 | Mattfeld |
| 5,926,466 A | 7/1999 | Ishida et al. |
| 6,380,823 B1 | 4/2002 | Ikata et al. |
| 7,276,992 B2 * | 10/2007 | Iwamoto et al. ............. 333/133 |
| 7,944,325 B2 * | 5/2011 | Korden ......................... 333/132 |
| 8,159,315 B2 | 4/2012 | Tsutsumi et al. |
| 2006/0066419 A1 | 3/2006 | Iwaki et al. |
| 2007/0046395 A1 | 3/2007 | Tsutsumi et al. |
| 2008/0218927 A1 | 9/2008 | Harada et al. |
| 2009/0174497 A1 * | 7/2009 | Korden ......................... 333/100 |
| 2010/0014886 A1 * | 1/2010 | Lee et al. ..................... 399/107 |
| 2010/0109800 A1 | 5/2010 | Ueda et al. |

(Continued)

FOREIGN PATENT DOCUMENTS

| CN | 1921303 A | 2/2007 |
| JP | 8-321738 A | 12/1996 |
| JP | 2000-349586 A | 12/2000 |

(Continued)

OTHER PUBLICATIONS

Chinese Office Action dated Jul. 23, 2014, in a counterpart Chinese patent application No. 201210165215.X.

(Continued)

*Primary Examiner* — Kwang B Yao
*Assistant Examiner* — Adam Duda
(74) *Attorney, Agent, or Firm* — Chen Yoshimura LLP

(57) ABSTRACT

A communication module includes: a plurality of receiving filters that are connected between an antenna terminal and a receiving terminal and have a receive band different from each other; and a passive circuit that is commonly connected to at least two of the plurality of receiving filters and makes a receive band of one of said at least two of the plurality of receiving filters suppressed when making another receive band of said at least two of the plurality of receiving filters transitable, wherein receiving terminals of said at least two of the plurality of receiving filters are commonalized through the passive circuit.

7 Claims, 25 Drawing Sheets

(56) References Cited

U.S. PATENT DOCUMENTS

| | | | |
|---|---|---|---|
| 2011/0156835 A1* | 6/2011 | Nagai | 333/132 |
| 2012/0313731 A1* | 12/2012 | Burgener et al. | 333/188 |

FOREIGN PATENT DOCUMENTS

| | | |
|---|---|---|
| JP | 2003-87076 A | 3/2003 |
| JP | 2010-45563 A | 2/2010 |
| WO | 2007/034589 A1 | 3/2007 |
| WO | 2009/025056 A1 | 2/2009 |
| WO | 2010/032389 A1 | 3/2010 |
| WO | 2011/034373 A2 | 3/2011 |

OTHER PUBLICATIONS

German Office Action dated Aug. 18, 2014, in a counterpart German patent application No. 10 2012 010 201.1.

Japanese Office Action dated Dec. 24, 2014, in counterpart Japanese patent application No. 2011-116352.

Chinese Office Action dated Jan. 9, 2015, in a counterpart Chinese patent application No. 201210165215.X.

* cited by examiner

COMMUNICATION MODULE

CROSS-REFERENCE TO RELATED APPLICATION

This application is based upon and claims the benefit of priority of the prior Japanese Patent Application No. 2011-116352, filed on May 24, 2011, the entire contents of which are incorporated herein by reference.

FIELD

A certain aspect of the present invention relates to a communication module.

BACKGROUND

Recently, multi-band is enabled in a wireless communication device such as a mobile phone, and a systemization of the wireless communication device is advancing. For example, a single mobile phone has a plurality of wireless devices. For example, a mobile phone covering a plurality of frequency bands is known. The mobile phone has a plurality of and a plurality of receiving filters in order to cover the plurality of frequency bands.

Japanese Patent Application Publication No. 2000-349586 (hereinafter referred to as Document 1) discloses a module having two duplexers. FIG. 12 of Document 1 discloses a structure in which an outer switch selects a receiving terminal to be electrically connected to a low noise amplifier from receiving terminals of the two duplexers. Japanese Patent Application Publication No. 2010-45563 (hereinafter referred to as Document 2) discloses a module in which two duplexers are provided, and each antenna terminal of the two duplexers is commonalized.

SUMMARY OF THE INVENTION

According to an aspect of the present invention, there is provided a communication module comprising: a plurality of receiving filters that are connected between an antenna terminal and a receiving terminal and have a receive band different from each other; and a passive circuit that is commonly connected to at least two of the plurality of receiving filters and makes a receive band of one of said at least two of the plurality of receiving filters suppressed when making another receive band of said at least two of the plurality of receiving filters transitable, wherein receiving terminals of said at least two of the plurality of receiving filters are commonalized through the passive circuit.

DETAILED DESCRIPTION

In a mobile phone covering a plurality of frequency bands, the number of components such as a receiving filter or a duplexer gets larger, and the number of receiving terminals gets larger. The number of wirings connecting the components gets larger. Therefore, a wiring pattern gets complicated. Recently, there are cases where a receiving circuit in an RF transceiver IC connected to receiving terminals of a receiving filter and a duplexer is constituted of a differential circuit. In this case, the number of receiving terminals of the receiving filter and the duplexer is two with respect to each receive band. Therefore, the number of receiving terminals gets larger, and the wiring pattern gets complicated.

Recently, an LTE (Long Term Evolution) is being used. In the LTE system, there are cases where a unique frequency band is used. The number of frequency bands to be covered by each mobile phone gets larger. Therefore, the number of the receiving filters and the duplexers gets larger. And, the wiring pattern gets complicated more.

There is a method of making a duplexer or a receiving filter tunable in order to solve the problem. However, it is difficult to make a duplexer or a receiving filter tunable if the duplexer or the receiving filter is an acoustic wave filter. It is difficult to cover a plurality of frequency bands with a single power amplifier or a single low noise amplifier.

Figure 1:
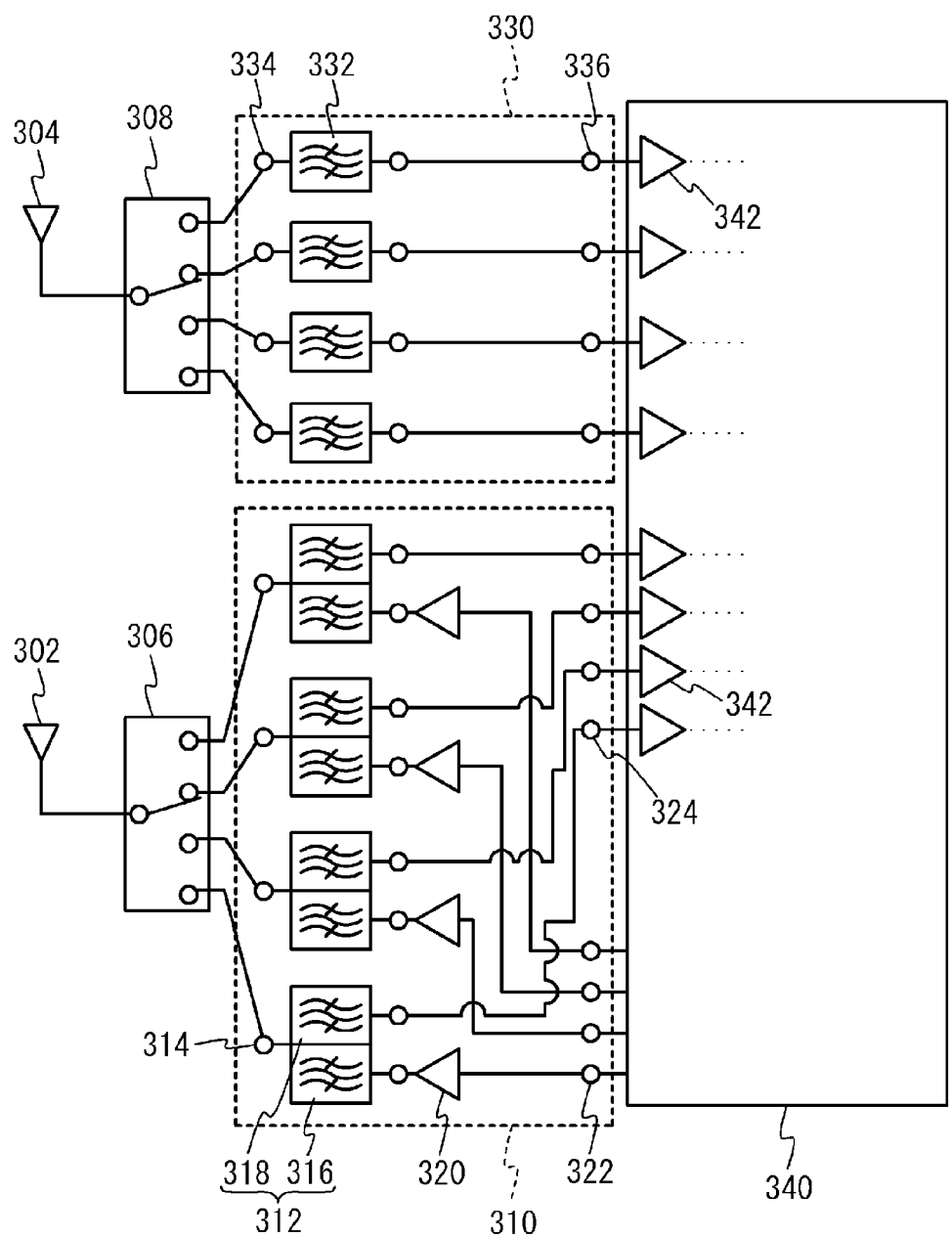
FIG. 1 illustrates an example of a block diagram of a wireless communication unit of a mobile phone including a communication module in accordance with a first comparative example and another communication module in accordance with a second comparative example.

First, comparative examples are described. FIG. 1 illustrates an example of a block diagram of a wireless communication unit of a mobile phone including a communication module in accordance with a first comparative example and another communication module in accordance with a second comparative example. The mobile phone covers four frequency bands. As illustrated in FIG. 1, the wireless communication unit has a main antenna 302 and a reception diversity antenna 304 complementing the main antenna 302. The main antenna 302 is connected to a communication module 310 in accordance with the first comparative example via a switch 306 for main antenna. The reception diversity antenna 304 is connected to a communication module 330 in accordance with the second comparative example via a switch 308 for reception diversity.

The communication module 310 in accordance with the first comparative example has four duplexers 312 for covering the four frequency bands. Each of the four duplexers 312 is connected to the switch 306 for main antenna via an antenna terminal 314. Thus, the switch 306 for main antenna is capable of selecting one of the four duplexers 312 to be electrically connected to the main antenna 302.

A transmitting filter 316 constituting the duplexer 312 is connected to a power amplifier 320. Each transmitting filter 316 of the four duplexers 312 is connected to an RF transceiver IC 340 via a transmitting terminal 322. Each receiving filter 318 constituting the duplexer 312 is connected to a low noise amplifier 342 in the RF transceiver IC 340 via a main receiving terminal 324.

The communication module 330 in accordance with the second comparative example has four receiving filters 332 in order to cover the four frequency bands. Each of the four receiving filters 332 is connected to the switch 308 for reception diversity via an antenna terminal 334. Thus, the switch 308 for reception diversity is capable of selecting one of the four receiving filters 332 to be electrically connected to the reception diversity antenna 304. Each of the four reception filters 332 is connected to another low noise amplifier 342 in the RF transceiver IC 340 via a reception diversity terminal 336.

The four frequency bands may be a Band 1 (transmit band: 1920 to 1980 MHz, receive band: 2110 to 2170 MHz), a Band 2 (transmit band: 1850 to 1910 MHz, receive band: 1930 to 1990 MHz), a Band 5 (transmit band: 824 to 849 MHz, receive band: 869 to 894 MHz), and a Band 8 (transmit band: 880 to 915 MHz, receive band: 925 to 960 MHz).

The wireless communication unit of the mobile phone illustrated in FIG. 1 has the four duplexers 312 in the communication module 310 and the four receiving filters 332 in the communication module 330 in order to cover the four frequency bands. Each receiving filter 318 of the four duplexers 312 is connected to the RF transceiver IC 340 via the main receiving terminal 324. The four receiving filters 332 are connected to the RF transceiver IC 340 via the reception diversity terminal 336. In the wireless communication unit of the mobile phone of FIG. 1, the number of receiving terminal of a duplexer and a receiving filter is large. Therefore, a wiring pattern is complicated.

Figure 2:
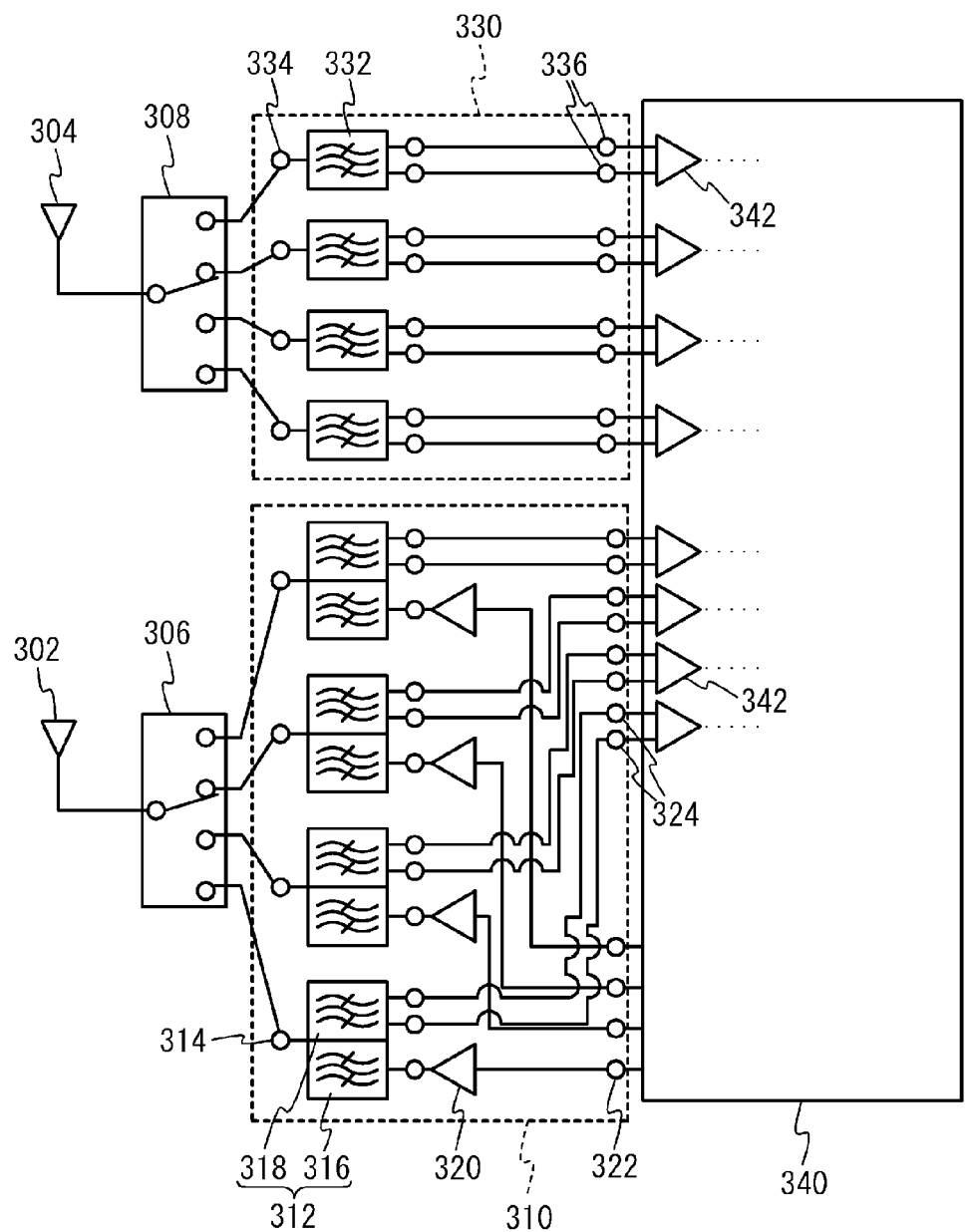
FIG. 2 illustrates an example of a block diagram of a wireless communication unit having an RF transceiver IC constituting a receiving circuit with a differential circuit.

Next, a description is given of another mobile phone having an RF transceiver IC constituting a receiving circuit with a differential circuit. FIG. 2 illustrates an example of a block diagram of a wireless communication unit having the RF transceiver IC constituting the receiving circuit with the differential circuit. As illustrated in FIG. 2, each receiving filter 318 of the four duplexers 312 is connected to the RF transceiver IC 340 via two main receiving terminals 324. Each of the four receiving filters 332 is connected to the RF transceiver IC 340 via two reception diversity terminals 336. The other structures are the same as those of FIG. 1. The explanation of the structures is omitted. In the case of using the differential circuit as illustrated in FIG. 2, the number of receiving terminal of a duplexer or a receiving filter is as twice as that of FIG. 1. Therefore, a wiring pattern gets more complicated.

And so, a description is given of a communication module in which the number of receiving terminal of a duplexer or a receiving filter may be reduced, and a wiring pattern may be simplified, without decreasing frequency bands to be covered.

Figure 3:
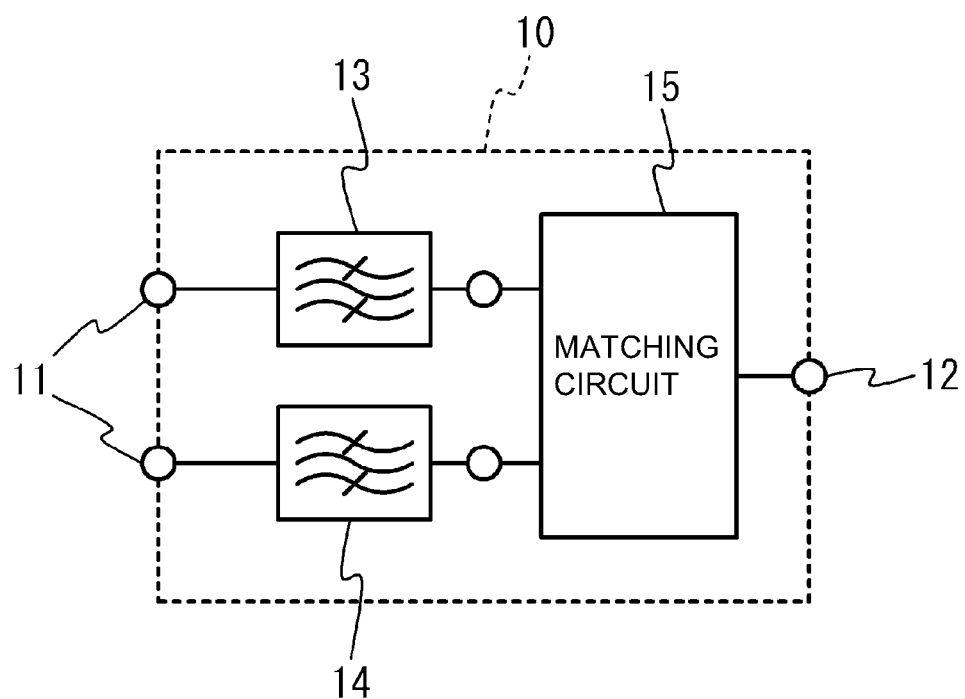
FIG. 3 illustrates an example of a block diagram of a communication module including a receiving filter.
Figure 4:
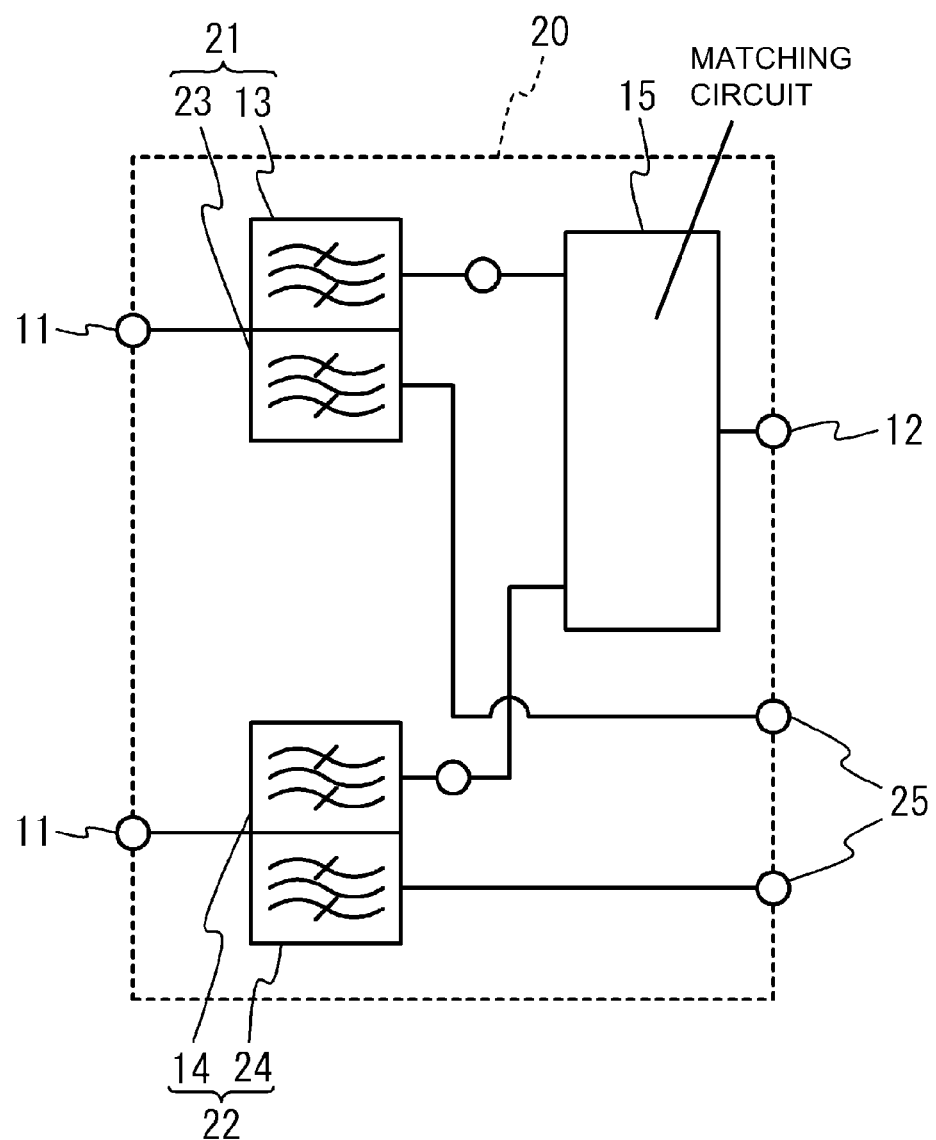
FIG. 4 illustrates an example of a block diagram of another communication module including a duplexer.

First, a description is given of a principle of embodiments, with reference to FIG. 3 and FIG. 4. Here, a description is given of an example of a communication module covering two frequency bands, in order to simplify the explanation. FIG. 3 illustrates an example of a block diagram of a communication module including a receiving filter. As illustrated in FIG. 3, a communication module 10 has a structure in which a first receiving filter 13 for a first frequency band, a second receiving filter 14 for a second frequency band, and a matching circuit 15 connected to the first receiving filter 13 and the second receiving filter 14 in common are connected between antenna terminals 11 and a receiving terminal 12. The first receiving filter 13 is connected to one of the antenna terminals 11. The second receiving filter 14 is connected to the other. A receiving terminal of the first receiving filter 13 and another receiving terminal of the second receiving filter 14 are commonalized into a single receiving terminal 12 through the matching circuit 15.

FIG. 4 illustrates an example of a block diagram of another communication module including duplexers. As illustrated in FIG. 4, a communication module 20 has a structure in which a first duplexer 21 for the first frequency band, a second duplexer 22 for the second frequency band, and another matching circuit 15 are connected between other antenna terminals 11, another receiving terminal 12 and transmitting terminals 25. The first duplexer 21 is connected to one of the antenna terminals 11. The second duplexer 22 is connected to the other. The first duplexer 21 includes another first receiving filter 13 for the first frequency band and a first transmitting filter 23. The second duplexer 22 includes another second receiving filter 14 and a second transmitting filter 24. The matching circuit 15 is connected to the first receiving filter 13 and the second receiving filter 14 in common. A receiving terminal of the first receiving filter 13 and another receiving terminal of the second receiving filter 14 are commonalized into a single receiving terminal 12 through the matching circuit 15. The first transmitting filter 23 is connected to one of the transmitting terminals 25. The second transmitting filter 24 is connected to the other.

Here, a description is given of a function of the matching circuit 15. The matching circuit 15 is a passive circuit. With respect to the receiving terminal 12, in the first frequency band, impedance of the matching circuit 15 matches that of the first receiving filter 13 for the first frequency band, and the impedance of the matching circuit 15 is larger than that of the second receiving filter 14 for the second frequency band. Further, with respect to the receiving terminal 12, in the second frequency band, the impedance of the matching circuit 15 is larger than that of the first receiving filter 13 for the first frequency band, and the impedance of the matching circuit 15 matches that of the second receiving filter 14 for the second frequency band. Therefore, the matching circuit 15 is capable of selecting a receiving filter to be electrically connected to the receiving terminal 12. That is, the matching circuit 15 makes the second frequency band suppressed when making the first frequency band transitable, and makes the first frequency band suppressed when making the second frequency band transitable.

In the communication modules of FIG. 3 and FIG. 4, a receiving terminal of the first receiving filter 13 and another receiving terminal of the second receiving filter 14 are commonalized into a single receiving terminal 12 through the matching circuit 15. Therefore, the number of receiving terminals may be decreased by half, compared to the case where a receiving terminal of the first receiving filter 13 and another receiving terminal of the second receiving filter 14 are provided separately. Further, a wiring pattern may be simplified. And, it is not necessary to provide a terminal for controlling newly, because the matching circuit 15 is constituted of a passive circuit. When the receiving terminal 12 is connected to a single low noise amplifier covering the first frequency band and the second frequency band, the number of wiring can be one between the receiving terminal 12 and the low noise amplifier. Thus, the wiring pattern may be simplified more. The number of inputting terminals of the RF transceiver IC may be reduced, because the low noise amplifier is provided in the RF transceiver IC.

It is demanded that the noise is reduced, because a received signal is weak. In the communication modules of FIG. 3 and FIG. 4, the number of wirings in which a received signal is transmitted is decreased. Therefore, the received signal does not get a noise easily. That is, a noise included in the received signal may be reduced, when the matching circuit 15 commonalizes a receiving terminal of the first receiving filter 13 and another receiving terminal of the second receiving filter 14. A low loss antenna switch is available now. A switching is possible with use of the antenna switch. Therefore, the antenna terminals 11 are not commonalized.

A description is now be given of embodiments with reference to the accompanying drawings.

First Embodiment

Figure 5:
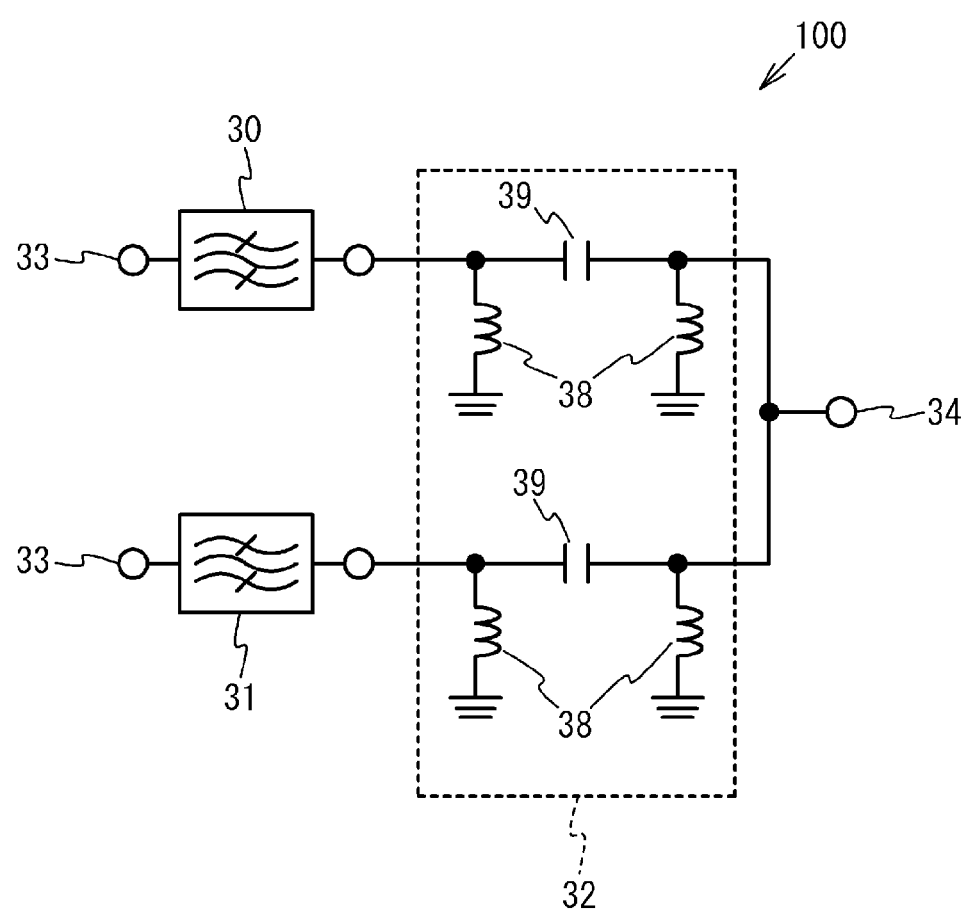
FIG. 5 illustrates an example of a circuit structure of a communication module in accordance with a first embodiment.

In a first embodiment, a description is given of a communication module having a receiving filter for the Band 1 (receive band: 2110 to 2170 MHz) and another receiving filter for the Band 2 (receive band: 1930 to 1990 MHz). FIG. 5 illustrates an example of a circuit structure of a communication module in accordance with the first embodiment. As illustrated in FIG. 5, a communication module 100 in accordance with the first embodiment has a first receiving filter 30 for Band 1, a second receiving filter 31 for Band 2, and a matching circuit 32 connected to the first receiving filter 30 and the second receiving filter 31 in common. An antenna terminal for Band 1 and another antenna terminal for Band 2 are provided separately. The first receiving filter 30 is connected to an antenna terminal 33 for Band 1. The second receiving filter 31 is connected to another antenna terminal 33 for Band 2. A receiving terminal of the first receiving filter 30 and another receiving terminal of the second receiving filter 31 are commonalized into a single receiving terminal 34 through the matching circuit 32.

Figure 6:
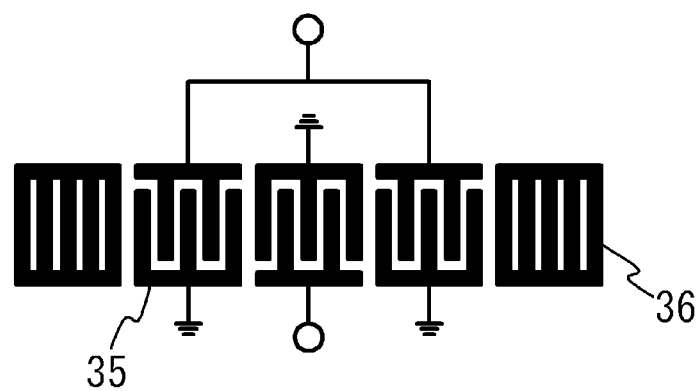
FIG. 6 illustrates a top view of a first receiving filter and a second receiving filter.

FIG. 6 illustrates a top view of the first receiving filter 30 and the second receiving filter 31. As illustrated in FIG. 6, the first receiving filter 30 and the second receiving filter 31 are constituted of an acoustic surface wave filter of a double mode coupling type in which three comb electrodes 35 are arrayed in a propagation direction of an acoustic wave on a piezoelectric substrate such as an LT (LiTaO$_3$) or an LN (LiNbO$_3$), and a reflector 36 is provided on both sides of the three comb electrodes 35. The comb electrode 35 and the reflector 36 are mainly composed of Al or Cu.

With reference to FIG. 5, impedance of the antenna terminal 33 is set to be 50Ω. Impedance of the receiving terminal 34 is set to be 100Ω. The matching circuit 32 includes inductors 38 connected in parallel and capacitors 39 connected in series. Two of the inductors 38 are connected to the first receiving filter 30 in parallel, and one of the capacitors 39 is connected to the first receiving filter 30 in series. Two of the inductors 38 are connected to the second receiving filter 31 in parallel, and one of the capacitors 39 is connected to the second receiving filter 31. An inductance and a Q value at 2 GHz of the inductors 38 connected to the first receiving filter 30 are 42 nH and 40. A capacitance and a Q value at 2 GHz of the capacitor 39 connected to the first receiving filter 30 is 3 pF and 100. An inductance and a Q value at 2 GHz of the inductors 38 connected to the second receiving filter 31 are 33 nH and 40. A capacitance and a Q value at 2 GHz of the capacitor 39 connected to the second receiving filter 31 are 1 pF and 100.

Figure 7:
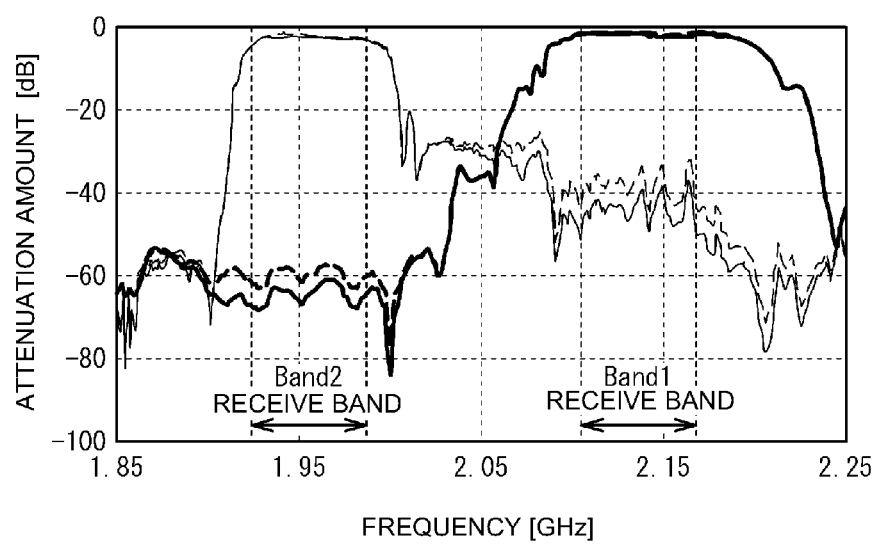
FIG. 7 illustrates transmission characteristics of a first receiving filter and a second receiving filter of a communication module in accordance with the first embodiment.
Figure 8:
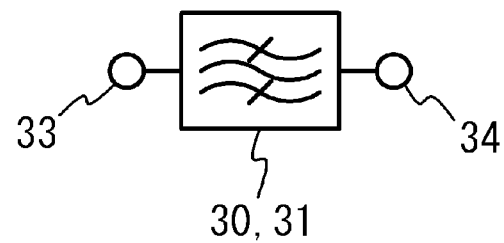
FIG. 8 illustrates an example of a block diagram of a first receiving filter and a second receiving filter when transmission characteristics are measured separately.

FIG. 7 illustrates transmission characteristics of the first receiving filter 30 and the second receiving filter 31 of the communication module 100 in accordance with the first embodiment. For comparison, transmission characteristics of the first receiving filter 30 and the second receiving filter 31 measured separately are illustrated in FIG. 7. FIG. 8 illustrates an example of a block diagram of the first receiving filter 30 and the second receiving filter 31 when the transmission characteristics are measured separately. As illustrated in FIG. 8, the first receiving filter 30 and the second receiving filter 31 are connected separately between the antenna terminal 33 and the receiving terminal 34. In FIG. 7, a thick solid line indicates the transmission characteristics of the first receiving filter 30 of the communication module 100. A thin solid line indicates the transmission characteristics of the second receiving filter 31 of the communication module 100. A thick dotted line indicates the transmission characteristics of the first receiving filter 30 measured separately. A thin dotted line indicates the transmission characteristics of the second receiving filter 31 measured separately. As illustrated in FIG. 7, the communication module 100 has preferable characteristics that are similar to those of the case where the transmission characteristics of the first receiving filter 30 and the second receiving filter 31 are measured separately. An attenuation amount of the communication module 100 is improved, compared to the case where the transmission characteristics of the first receiving filter 30 and the second receiving filter 31 are measured separately. This is because the attenuation amount is improved because the receiving terminal 34 is connected via the matching circuit 32.

Figure 9:
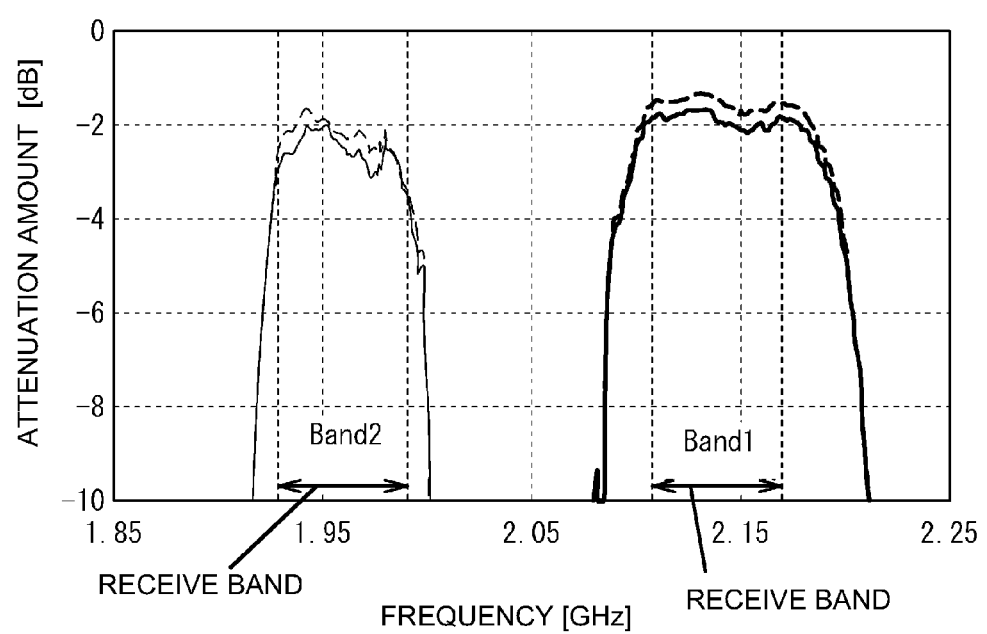
FIG. 9 illustrates an enlarged view of receive bands of FIG. 7.

FIG. 9 illustrates an enlarged view of the receive bands of FIG. 7. As illustrated in FIG. 9, an insertion loss of the communication module 100 is increased by approximately 0.3 dB, compared to the case where the transmission characteristics of the first receiving filter 30 and the second receiving filter 31 are measured separately. This increase may be improved when a matching circuit having a high Q value is used as the matching circuit 32, because the increase of insertion loss depends on the Q value of the matching circuit 32. When the receiving terminal 34 commonalized through the matching circuit 32 is used, improvement of the attenuation amount may be allowed as illustrated in FIG. 7. Therefore, the increase of the insertion loss may be canceled when the attenuation amount and the loss of the filters are set to be low.

As mentioned above, the communication module 100 has the first receiving filter 30 for Band 1, the second receiving filter 31 for Band 2, and the matching circuit 32 that is connected to the first receiving filter 30 and the second receiving filter 31 in common and makes one of the Band 1 and the Band 2 suppressed when making the other transitable. The receiving terminals of the first receiving filter 30 and the second receiving filter 31 are commonalized through the matching circuit 32. Thus, the matching circuit 32 is capable of selecting a receiving filter to be connected to the commonalized receiving terminal 34 according to the frequency band. And, the number of receiving terminals may be reduced. Therefore, the complexity of the wiring pattern may be lightened. And, as explained with reference to FIG. 7, the attenuation amount may be improved.

Figure 14:
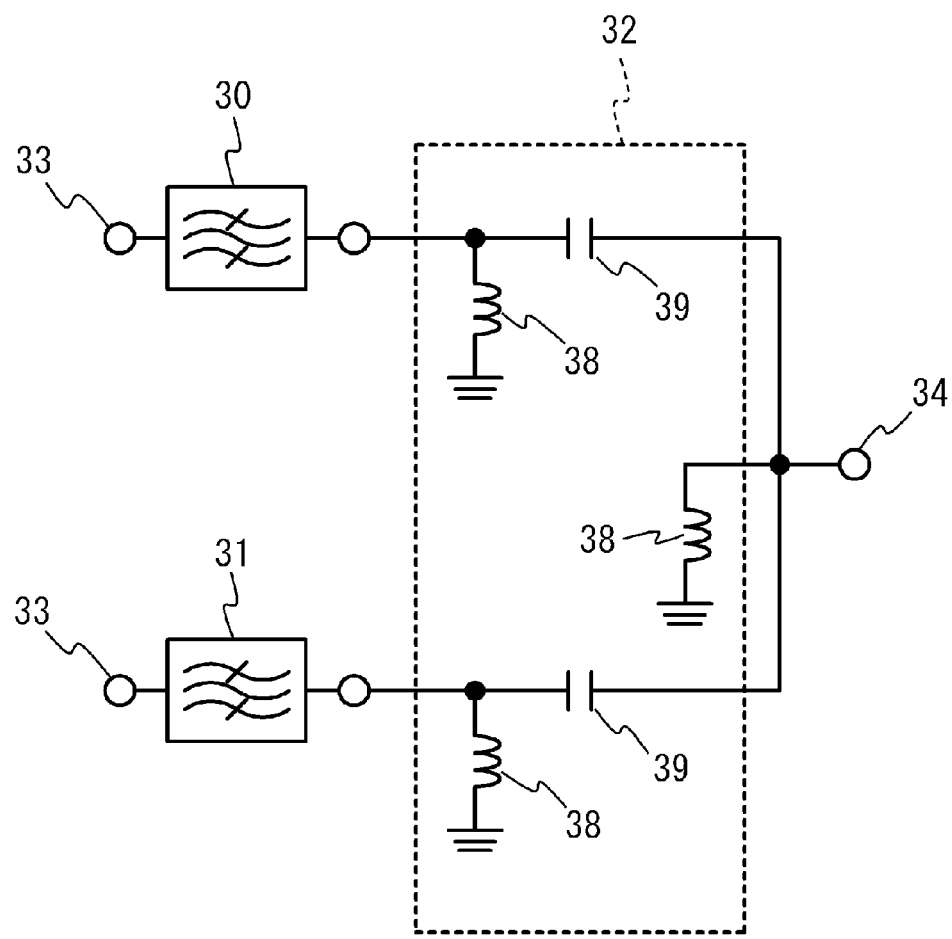
FIG. 14 illustrates a circuit diagram of a matching circuit in accordance with a first modified embodiment.
Figure 21:
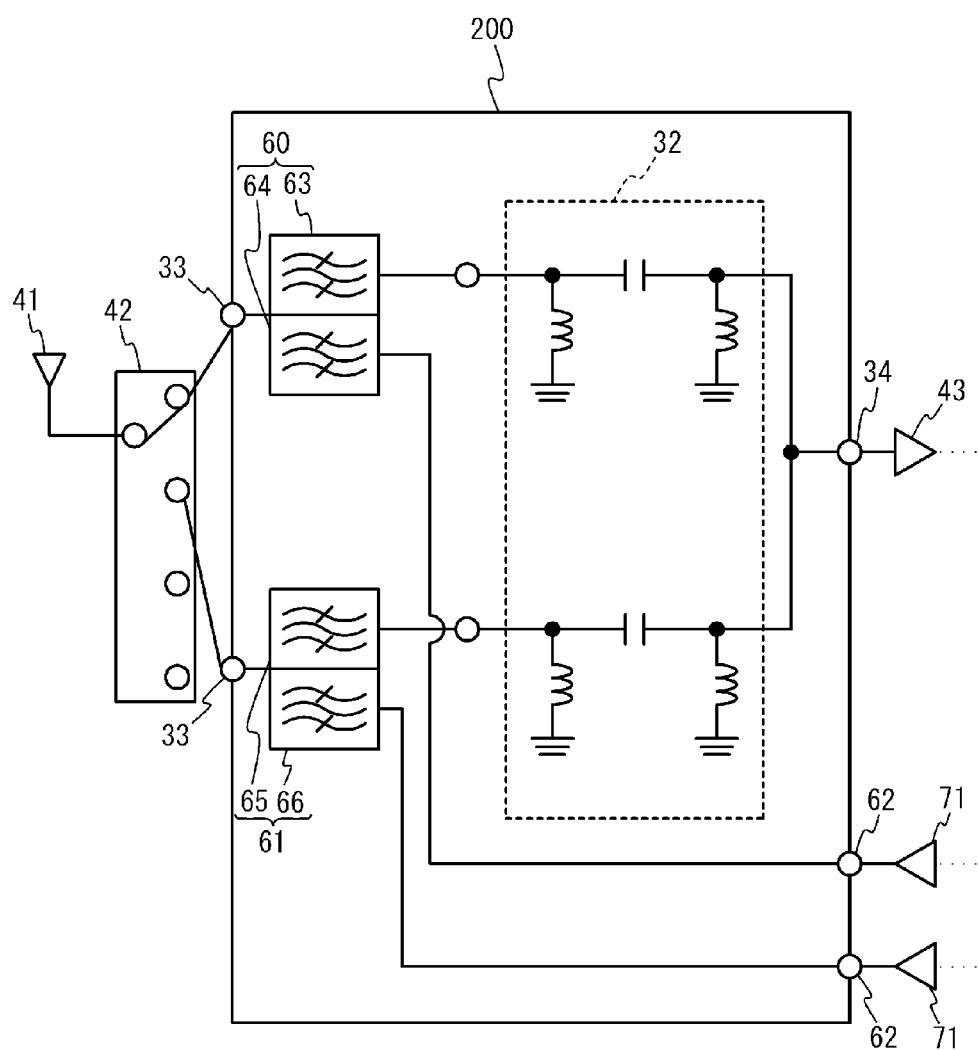
FIG. 21 illustrates an example of a block diagram of a wireless communication unit including a communication module in accordance with the second embodiment.
Figure 22:
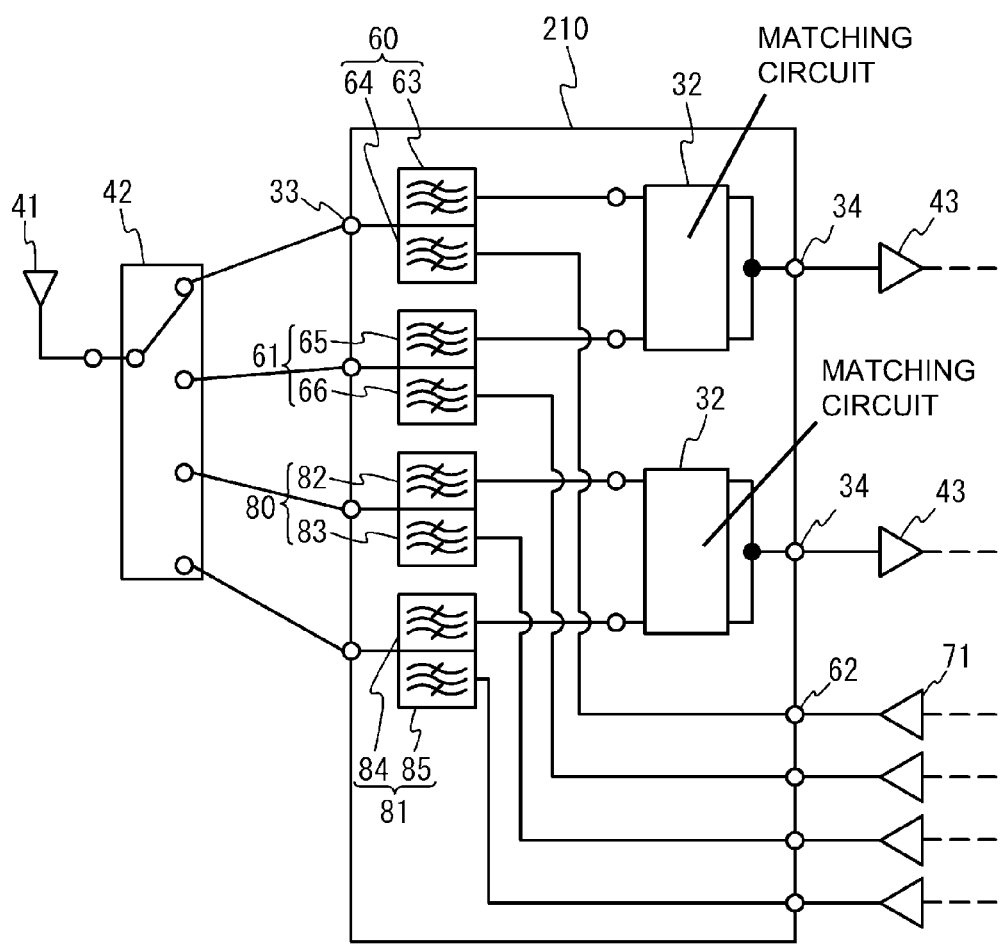
FIG. 22 illustrates an example of a block diagram of a wireless communication unit having a communication module in accordance with a first modified embodiment of the second embodiment.

FIG. 14 of the above-referenced Japanese Patent Application Publication, No. 2000-349586, (referred to as "Document 1") discloses a structure in which receiving terminals are commonalized in a module having two duplexers. However, a paragraph 0071 of Document 1 discloses that two receive bands are overlapped with each other in the structure. Therefore, the structure of Document 1 fails to cover a plurality of frequency bands. FIG. 21 and FIG. 22 of Document 1 illustrate a connection diagram of a receiving filter in which receiving terminals are commonalized. However, in the connection diagram, two receiving filters are simply connected in parallel. Therefore, Document 1 fails to disclose a receiving filter covering a plurality of frequency bands.

Figure 10:
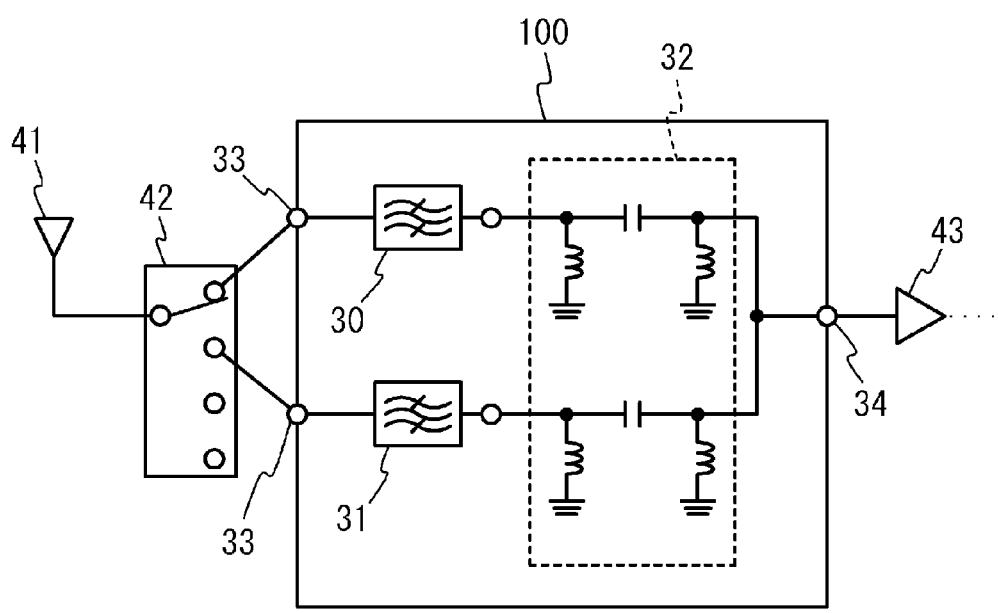
FIG. 10 illustrates an example of a block diagram of a wireless communication unit including a communication module in accordance with the first embodiment.

FIG. 10 illustrates an example of a block diagram of a wireless communication unit including the communication module 100. As illustrated in FIG. 10, the wireless communication unit has the communication module 100, an antenna 41, an antenna switch 42 connected to the antenna 41, and a low noise amplifier 43. The first receiving filter 30 of the communication module 100 is connected to the antenna switch 42 via one of the antenna terminals 33. The second receiving filter 31 of the communication module 100 is connected to the antenna switch 42 via the other. Thus, the antenna switch 42 is capable of selecting one of the first receiving filter 30 and the second receiving filter 31 to be electrically connected to the antenna 41. The receiving terminal 34 commonalized through the matching circuit 32 is connected to the low noise amplifier 43 covering the Band 1 and the Band 2.

The receive band of the Band 1 (2110 to 2170 MHz) is near the receive band of the Band 2 (1930 to 1990 MHz). Therefore, it is possible to configure a low noise amplifier to cover the both bands. Therefore, the number of the low noise amplifier 43 connected to the receiving terminal 34 commonalized through the matching circuit 32 may be one. And, the number of a wiring between the receiving terminal 34 and the low noise amplifier 43 may be one. This allows lightening of the complexity of the wiring pattern more.

Figure 11:
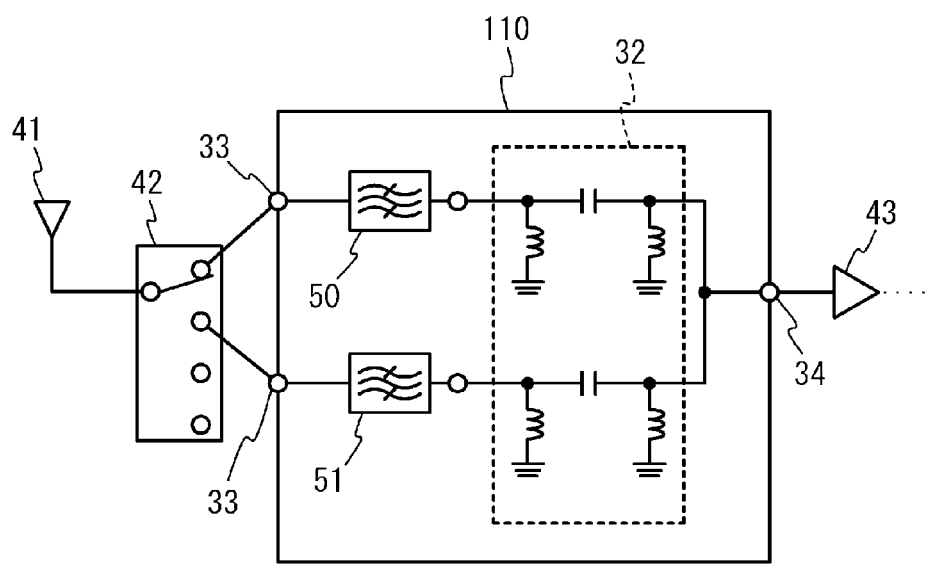
FIG. 11 illustrates an example of a block diagram of a wireless receiving unit having a communication module in accordance with a first modified embodiment of the first embodiment.

FIG. 11 illustrates an example of a block diagram of a wireless receiving unit having a communication module in accordance with a first modified embodiment of the first embodiment. As illustrated in FIG. 11, a communication module 110 in accordance with the first modified embodiment has a third receiving filter 50 for Band 5 (receive band: 869 to 894 MHz) and a fourth receiving filter 51 for Band 8 (receive band: 925 to 960 MHz). The low noise amplifier 43 covers the Band 5 and the Band 8. The other structures are the same as those of FIG. 10. Therefore, the explanation of the other structures is omitted.

In FIG. 11, the receive band of the Band 5 is near that of the Band 8. Therefore, it is possible to configure a low noise amplifier to cover the both bands. Therefore, the number of the low noise amplifier 43 connected to the receiving terminal 34 commonalized through the matching circuit 32 may be one. And, the number of wirings between the receiving terminal 34 and the low noise amplifier 43 may be one. This allows lightening of the complexity of the wiring pattern more.

Figure 12:
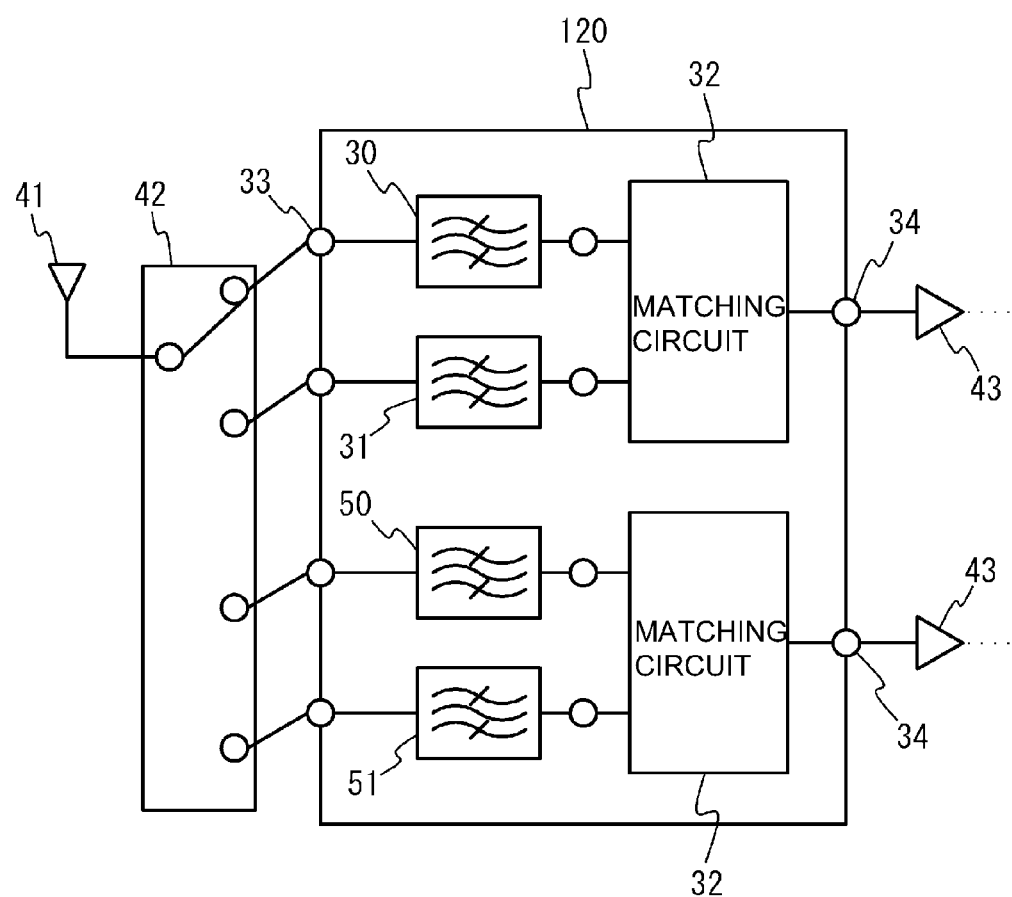
FIG. 12 illustrates an example of a block diagram of another wireless receiving unit having a communication module in accordance with a second modified embodiment of the first embodiment.

FIG. 12 illustrates an example of a block diagram of another wireless receiving unit having a communication module in accordance with a second modified embodiment of the first embodiment. As illustrated in FIG. 12, a communication module 120 in accordance with the second modified embodiment has the first receiving filter 30 for Band 1, the second receiving filter 31 for Band 2, the third receiving filter 50 for Band 5 and the fourth receiving filter 51 for Band 8. The matching circuit 32 is connected to the first receiving filter 30 and the second receiving filter 31 in common. Receiving terminals of the receiving filters are commonalized into the receiving terminal 34 through the matching circuit 32. The receiving terminal 34 is connected to a low noise amplifier 43 covering the receive bands of the Band 1 and the Band 2. Similarly, another matching circuit 32 is connected to the third receiving filter 50 and the fourth receiving filter 51 in common. Receiving terminals of the receiving filters are commonalized into another receiving terminal 34 through the matching circuit 32. The receiving terminal 34 is connected to another low noise amplifier 43 covering the receive bands of the Band 5 and the Band 8.

In FIG. 12, the number of the low noise amplifier 43 connected to the receiving terminal 34 commonalized through the matching circuit 32 is one. This allows lightening of the complexity of the wiring pattern between the receiving terminal 34 and the low noise amplifier 43 more.

The communication modules in accordance with the first embodiment have two or four receiving filters. And, a passive circuit is connected to two receiving filters in common. However, the structure is not limited. In another structure, a plurality of receiving filters having a different receive band may be provided between an antenna terminal and a receiving terminal; at least two of the receiving filters may be connected to a passive circuit in common; and receiving terminals of the receiving filters may be commonalized through the passive circuit. The passive circuit may have a function of making one of receive bands of at least two receiving filters suppressed when making the other transitable. This allows selecting a receiving filter to be connected to a commonalized receiving terminal according to a frequency band by the passive circuit. And, the number of receiving terminals may be reduced. Therefore, the complexity of the wiring patter may be lightened.

As explained with reference to FIG. 10 to FIG. 12, it is preferable that the passive circuit is commonly connected to receiving filters having receive bands adjacent to each other, and receiving terminals of the receiving filters having adjacent receive bands are commonalized through a matching circuit. In this case, the number of low noise amplifiers connected to the commonalized receiving terminal may be reduced. Therefore, the complexity of the wiring pattern may be lightened more. And, the frequency band of the low noise amplifier is limited. Therefore, the impedance matching may be easier. The performance of the low noise amplifier may be improved. The receiving performance may be improved.

Figure 13:
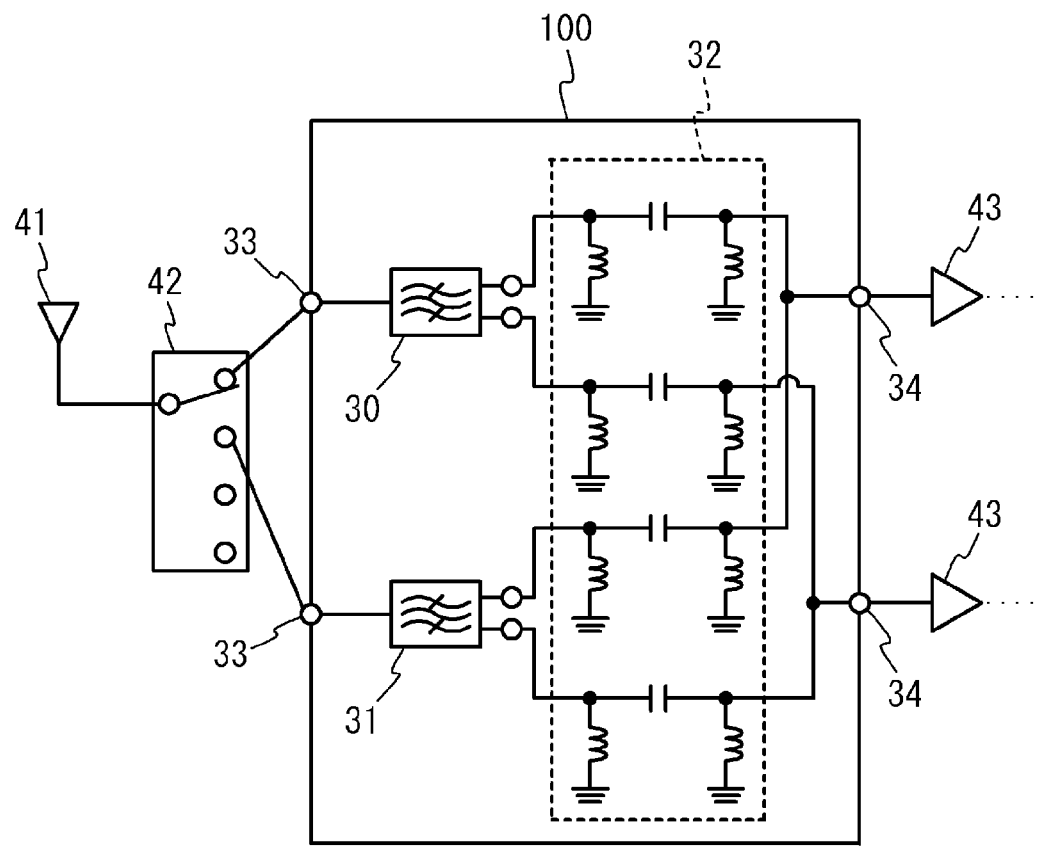
FIG. 13 illustrates an example of a block diagram of a wireless receiving unit having a communication module in accordance with the first embodiment having a differential receiving filter.

In the communication modules of the first embodiment, the first receiving filter 30 and the second receiving filter 31 may be a differential filter having two receiving terminals. FIG. 13 illustrates an example of a block diagram of a wireless receiving unit having a communication module in accordance with the first embodiment having a differential receiving filter. As illustrated in FIG. 13, one of the receiving terminals of the first receiving filter 30 and one of the receiving terminals of the second receiving filter 31 are commonalized through the matching circuit 32. The other of the first receiving filter 30 and the other of the second receiving filter 31 are commonalized through the matching circuit 32. When a plurality of receiving filters are a differential filter having two receiving terminals, the number of the receiving terminals is twice as the case where the receiving filters are not differential filters. Therefore, the effect of reducing the number of receiving terminals by commonalizing receiving terminals is enlarged.

Figure 15:
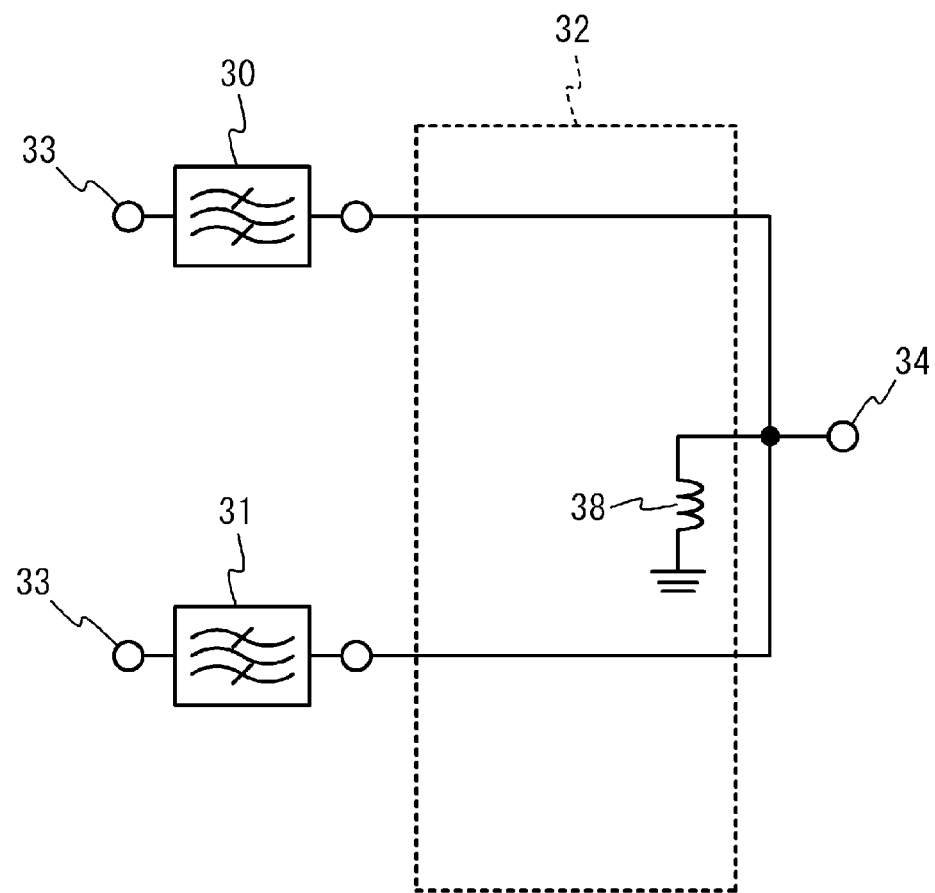
FIG. 15 illustrates a circuit diagram of the matching circuit in accordance with a second modified embodiment.

In FIG. 5, the matching circuit 32 acting as a passive circuit has a structure in which the inductors 38 connected in parallel and the capacitor 39 connected in series are provided with respect to each receiving filter. The structure is not limited. FIG. 14 illustrates a circuit diagram of the matching circuit in accordance with a first modified embodiment. FIG. 15 illustrates a circuit diagram of the matching circuit in accordance with a second modified embodiment. As illustrated in FIG. 14, the inductors 38 on the side of the commonalized receiving terminal 34 may be combined into one inductor. In this case, the number of elements in the matching circuit 32 is reduced, and the insertion loss is reduced. As illustrated in FIG. 15, the matching circuit 32 may be constituted with only one inductor 38, by adjusting impedance of each receiving filter. As mentioned above, it is preferable that the passive circuit has at least the inductors 38 connected in parallel. In this case, the inductors having a large resistance are used as a parallel element. Therefore, the loss increase caused by providing of a matching circuit is restrained.

In the communication modules in accordance with the first embodiment, the impedance of the receiving terminal 34 is 100Ω. However, the input impedance of the low noise amplifier 43 is not limited to 100Ω. It is therefore preferable that the matching circuit 32 has an impedance-converting function so as to be connected directly to each low noise amplifier 43. In this case, it is not necessary to provide an outer matching circuit between the communication modules and the low noise amplifier.

Second Embodiment

Figure 16:
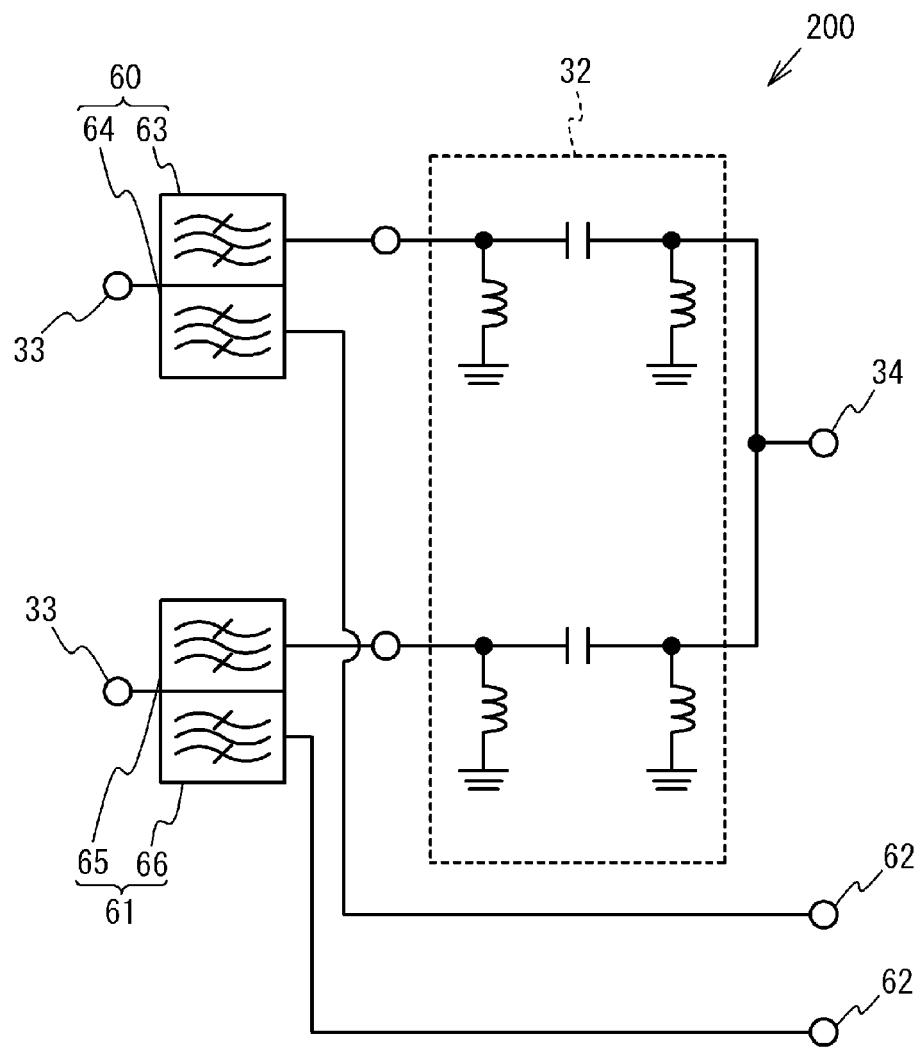
FIG. 16 illustrates a circuit diagram of a communication module in accordance with a second embodiment.

In a second embodiment, a description is given of a communication module having a duplexer for Band 1 (transmit band: 1920 to 1980 MHz, receive band: 2110 to 2170 MHz) and a duplexer for Band 2 (transmit band: 1850 to 1910 MHz, receive band: 1930 to 1990 MHz). FIG. 16 illustrates a circuit diagram of a communication module in accordance with the second embodiment. As illustrated in FIG. 16, a communication module 200 in accordance with the second embodiment has a first duplexer 60 for Band 1, a second duplexer 61 for Band 2 and the matching circuit 32. The first duplexer 60 includes a first receiving filter 63 and a first transmitting filter 64. The second duplexer 61 includes a second receiving filter 65 and a second transmitting filter 66. The matching circuit 32 is connected to the first receiving filter 63 and the second receiving filter 65 in common.

An antenna terminal for Band 1 and another antenna terminal for Band 2 are provided separately. The first duplexer 60 is connected to the antenna terminal 33 for Band 1. The second duplexer 61 is connected to another antenna terminal 33 for Band 2. A transmitting terminal for Band 1 and another transmitting terminal for Band 2 are provided separately. The first transmitting filter 64 is connected to a transmitting terminal 62 for Band 1. The second transmitting filter 66 is connected to another transmitting terminal 62 for Band 2. Receiving terminals of the first receiving filter 63 and the second receiving filter 65 are commonalized through the matching circuit 32 and constitute one receiving terminal 34.

Figure 17:
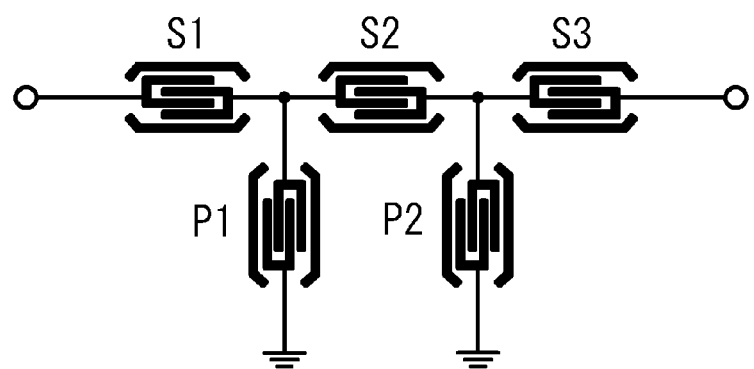
FIG. 17 illustrates a circuit topology of a first transmitting filter and a second transmitting filter.

FIG. 17 illustrates a circuit topology of the first transmitting filter 64 and the second transmitting filter 66. As illustrated in FIG. 17, the first transmitting filter 64 and the second transmitting filter 66 are constituted of an acoustic surface wave filter of a ladder type in which series resonators S1 to S3 connected in series and parallel resonators P1 and P2 connected in parallel with respect to the series resonators are provided on a piezoelectric substrate such as an LT or an LN. The first receiving filter 63 and the second receiving filter 65 are constituted of an acoustic surface wave filter of double mode type. The structure is explained with reference to FIG. 6. Therefore, the explanation of the structure is omitted.

With reference to FIG. 16, impedance of the antenna terminal 33 is set to be 50Ω. A resistance of the transmitting terminal 62 is set to be 50Ω. Impedance of the receiving terminal 34 is set to be 100Ω. The matching circuit 32 has the same structure as that of the first embodiment. The structure is explained with reference to FIG. 5. Therefore, the explanation of the structure is omitted.

Figure 18:
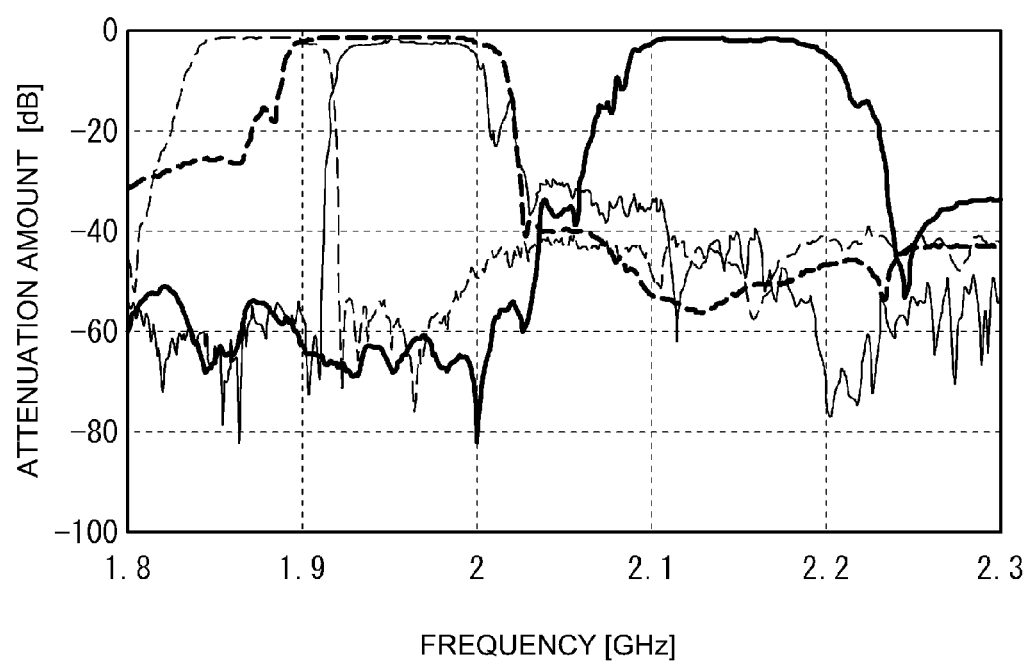
FIG. 18 illustrates transmission characteristics of a first duplexer and a second duplexer of a communication module in accordance with the second embodiment.

FIG. 18 illustrates transmission characteristics of the first duplexer 60 and the second duplexer 61 of the communication module 200. In FIG. 18, a thick solid line indicates transmission characteristics of the first receiving filter 63 of the first duplexer 60. A thick dotted line indicates transmission characteristics of the first transmitting filter 64 of the first duplexer 60. A thin solid line indicates transmission characteristics of the second receiving filter 65 of the second duplexer 61. A thin dotted line indicates transmission characteristics of the second transmitting filter 66 of the second duplexer 61. As illustrated in FIG. 18, both the first duplexer 60 and the second duplexer 61 have preferable performance in the receive band and the transmit band.

Figure 19:
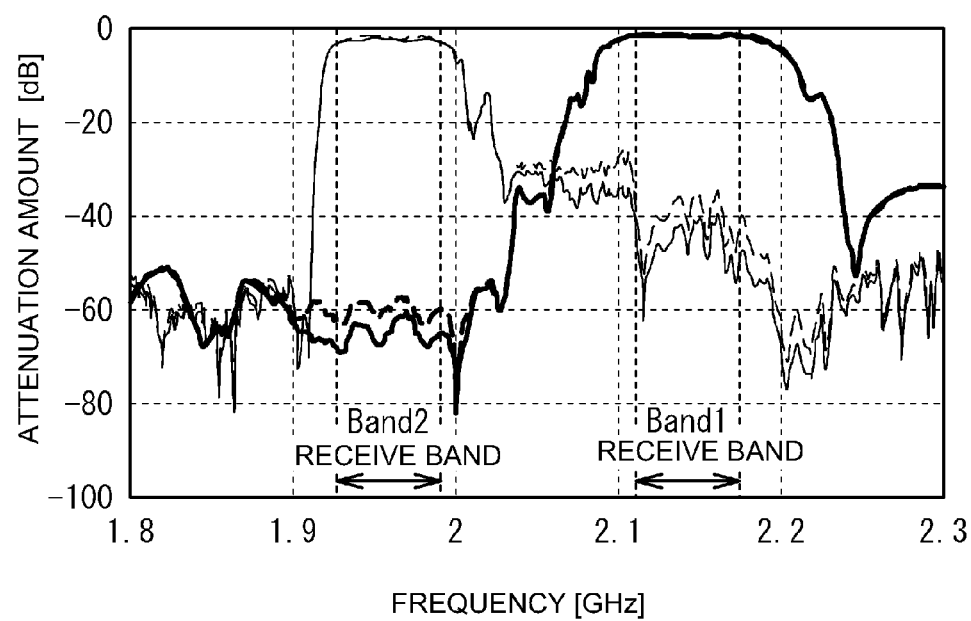
FIG. 19 illustrates a comparison between transmission characteristics between an antenna terminal and a receiving terminal of a communication module in accordance with the second embodiment and those of a first duplexer and a second duplexer measured separately.

FIG. 19 illustrates a comparison between the transmission characteristics between the antenna terminal and the receiving terminal of the communication module 200 and those of the first duplexer 60 and the second duplexer 61 measured separately. In FIG. 19, a thick solid line indicates the transmission characteristics of the first receiving filter 63 of the first duplexer 60 of the communication module 200. A thin solid line indicates the transmission characteristics of the second receiving filter 65 of the second duplexer 61. A thick dotted line indicates the transmission characteristics of the first receiving filter 63 when the first duplexer 60 is measured separately. A thin dotted line indicates the transmission characteristics of the second receiving filter 65 when the second duplexer 61 is measured separately. As illustrated in FIG. 19, the communication module 200 has preferable characteristics that are similar to those of the case where the transmission characteristics of the first duplexer 60 and the second duplexer 61 are measured separately. An attenuation amount of the communication module 200 is improved, compared to the case where the transmission characteristics of the first duplexer 60 and the second duplexer 61 are measured separately.

Figure 20:
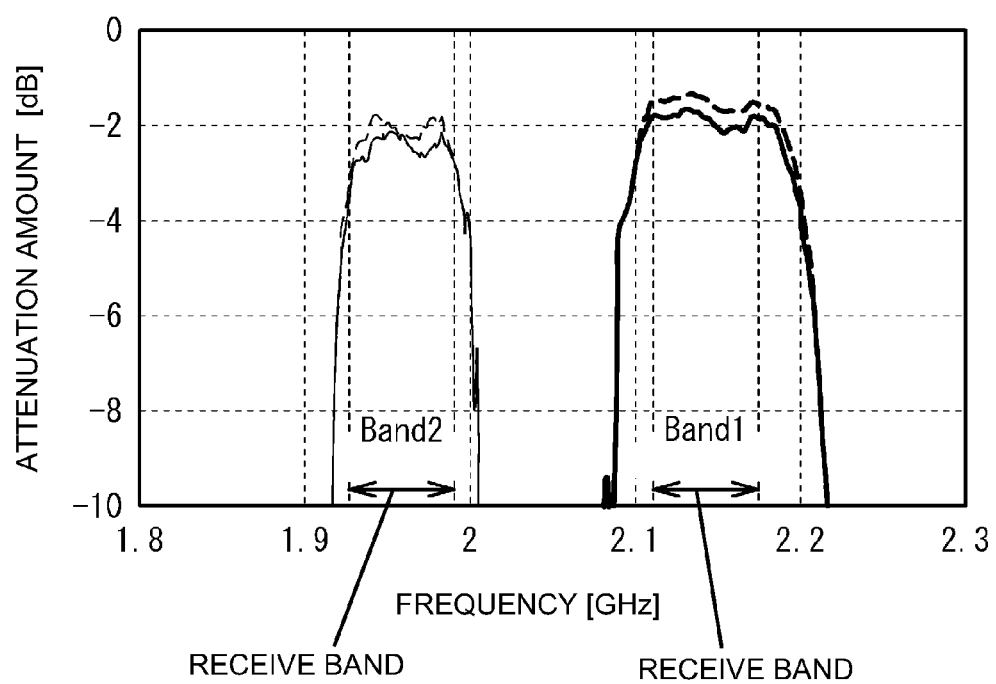
FIG. 20 illustrates an enlarged view of receive bands of FIG. 19.

FIG. 20 illustrates an enlarged view of the receive bands of FIG. 19. As illustrated in FIG. 20, an insertion loss of the communication module 200 is increased by approximately 0.3 dB, compared to the case where the transmission characteristics of the first duplexer 60 and the second duplexer 61 are measured separately. This increase may be improved when a matching circuit having a high Q value is used as the matching circuit 32, because the increase depends on the Q value of the matching circuit 32. When the receiving terminal 34 commonalized through the matching circuit 32 is used, improvement of the attenuation amount may be allowed as illustrated in FIG. 19. Therefore, the increase of the insertion loss may be canceled when the attenuation amount and the loss of the filters are set to be low.

As mentioned above, the communication module 200 has the first duplexer 60 for Band 1, the second duplexer 61 for Band 2, and the matching circuit 32 that is connected to the first receiving filter 63 constituting the first duplexer 60 and the second receiving filter 65 constituting the second duplexer 61 in common and makes one of the Band 1 and the Band 2 suppressed when making the other transitable. The receiving terminals of the first receiving filter 63 and the second receiving filter 65 are commonalized through the matching circuit 32. Thus, the matching circuit 32 is capable of selecting a receiving filter to be connected to the commonalized receiving terminal 34 according to the frequency band. And, the number of receiving terminals may be reduced. Therefore, the complexity of the wiring pattern may be lightened. And, as explained with reference to FIG. 19, the attenuation amount may be improved.

FIG. 21 illustrates an example of a block diagram of a wireless communication unit including the communication module 200. As illustrated in FIG. 21, the wireless communication unit has the communication module 200, the antenna 41, the antenna switch 42 connected to the antenna 41, the low noise amplifier 43 and a power amplifier 71. The first duplexer 60 of the communication module 200 is connected to the antenna switch 42 via one of the antenna terminals 33. The second duplexer 61 of the communication module 200 is connected to the antenna switch 42 via the other. Thus, the antenna switch 42 is capable of selecting one of the first duplexer 60 and the second duplexer 61 to be electrically connected to the antenna 41. The receiving terminal 34 commonalized through the matching circuit 32 is connected to the low noise amplifier 43 covering the Band 1 and the Band 2. A power amplifier 71 for Band 1 is connected to the transmitting terminal 62 of the first transmitting filter 64. Another power amplifier 71 for Band 2 is connected to the transmitting terminal 62 of the second transmitting filter 66.

As explained in the first embodiment, it is possible to configure a low noise amplifier covering the Band 1 and the Band 2. Therefore, the number of the low noise amplifier 43 connected to the receiving terminal 34 commonalized through the matching circuit 32 may be one. This allows lightening of the complexity of the wiring pattern more.

FIG. 22 illustrates an example of a block diagram of a wireless communication unit having a communication module in accordance with the first modified embodiment of the second embodiment. As illustrated in FIG. 22, a communication module 210 in accordance with the first modified embodiment has a third duplexer 80 for Band 5 (transmit band: 824 to 849 MHz, receive band: 869 to 894 MHz) and a fourth duplexer 81 for Band 8 (transmit band 880 to 915 MHz, receive band: 925 to 960 MHz) in addition to the first duplexer 60 for Band 1 and the second duplexer 61 for Band 2.

The transmitting terminal 62 of the first transmitting filter 64 constituting the first duplexer 60 is connected to the power amplifier 71 for Band 1. The transmitting terminal 62 of the second transmitting filter 66 constituting the second duplexer 61 is connected to the power amplifier 71 for Band 2. The transmitting terminal 62 of the third transmitting filter 83 constituting the third duplexer 80 is connected to the power amplifier 71 for Band 5. The transmitting terminal 62 of the fourth transmitting filter 85 constituting the fourth duplexer 81 is connected to the power amplifier 71 for Band 8.

The matching circuit 32 is connected to the first receiving filter 63 constituting the first duplexer 60 and the second receiving filter 65 constituting the second duplexer 61 in common. Receiving terminals of the receiving filters are commonalized into the receiving terminal 34 through the matching circuit 32. The receiving terminal 34 is connected to the low noise amplifier 43 covering the receive bands of the Band 1 and the Band 2. Similarly, another matching circuit 32 is connected to the third receiving filter 82 constituting the third duplexer 80 and the fourth receiving filter 84 constituting the fourth duplexer 81 in common. Receiving terminals of the receiving filters are commonalized into another receiving terminal 34 through the matching circuit 32. The receiving terminal 34 is connected to another low noise amplifier 43 covering the frequency bands of the Band 5 and the Band 8.

In FIG. 22, the number of the low noise amplifier 43 connected to the receiving terminal 34 commonalized through the matching circuit 32 is one. This allows lightening of the complexity of the wiring pattern between the receiving terminal 34 and the low noise amplifier 43 more.

The communication modules in accordance with the second embodiment have two or four duplexers between an antenna terminal and a receiving terminal or a transmitting terminal. However, the structure is not limited. In another structure, a plurality of duplexers may be provided. That is, a plurality of receiving filters having a different receive band may be provided between an antenna terminal and a receiving terminal; a plurality of transmitting filters having a different transmit band may be provided between the antenna terminal and a transmitting terminal; and a plurality of duplexers are constituted of the plurality of the receiving filters and the plurality of the transmitting filters. In this case, when at least two receiving filters of the plurality of the duplexers included in the plurality of the duplexers are connected to a passive circuit in common and receiving terminals of the receiving filters are commonalized through the passive circuit, the number of receiving terminals may be reduced.

Figure 23:
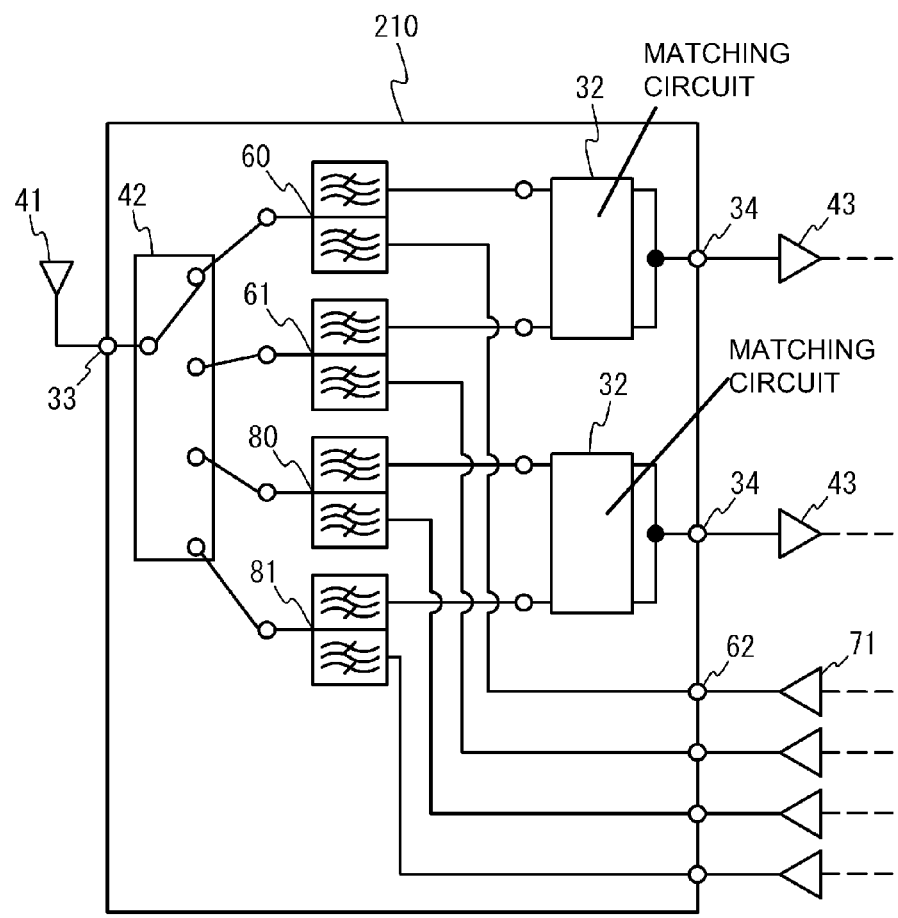
FIG. 23 illustrates an example of a block diagram of a wireless communication unit having a communication module in accordance with the first modified embodiment of the second embodiment having an antenna switch.

In the first embodiment and the second embodiment, as illustrated in FIG. 12 and FIG. 22, the communication module does not have an antenna switch. However, the structure is not limited. The communication module may have an antenna switch. FIG. 23 illustrates an example of a block diagram of a wireless communication module having a communication unit in accordance with the first modified embodiment of the second embodiment having an antenna switch. As illustrated in FIG. 23, the antenna switch 42 is mounted on the communication module 210. The other structures are the same as those of FIG. 22. Therefore, the explanation of the structures is omitted. When the antenna switch 42 is mounted on the communication module 210, the number of the antenna terminal 33 included in the communication module 200 may be one. And the wiring pattern may be simplified more.

Figure 24:
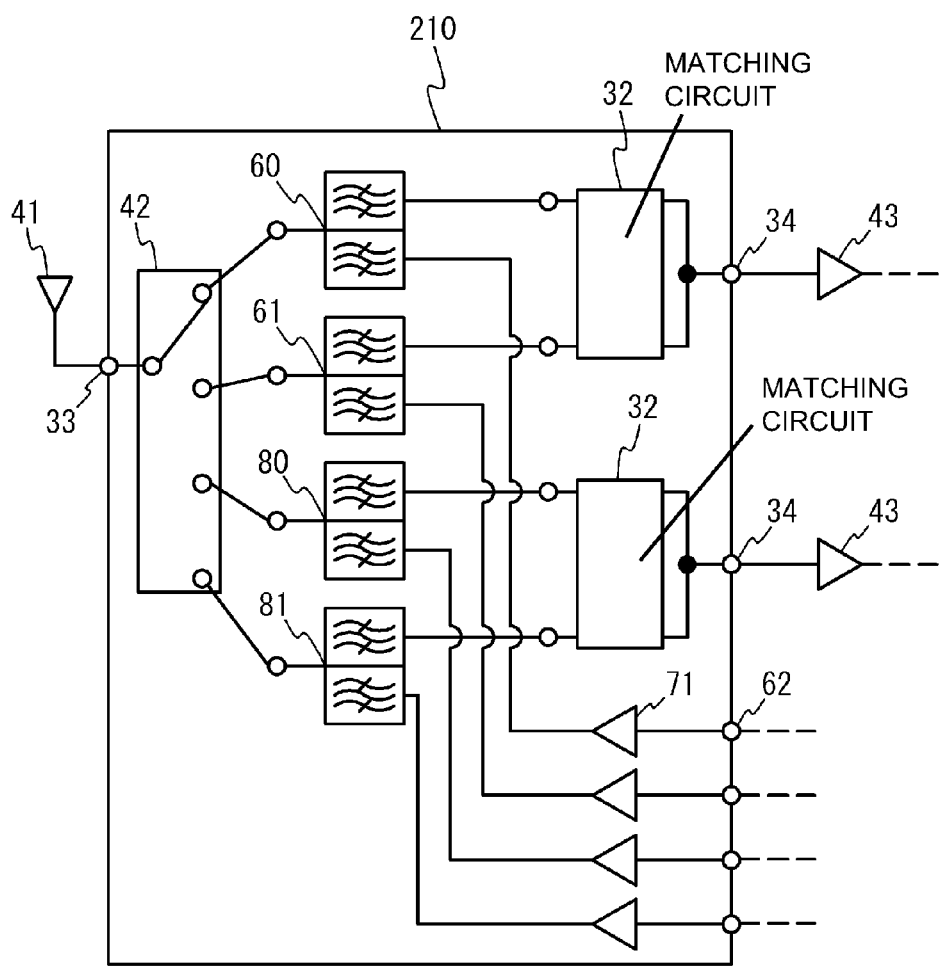
FIG. 24 illustrates an example of a block diagram of a wireless communication unit having a communication module in accordance with the first modified embodiment of the second embodiment on which a power amplifier is mounted.

In the second embodiment, as illustrated in FIG. 22, the power amplifier 71 is not mounted on the communication module. However, the structure is not limited. The power amplifier 71 may be mounted on the communication module. FIG. 24 illustrates an example of a block diagram of a wireless communication unit having the communication module in accordance with the first modified embodiment of the second embodiment on which a power amplifier is mounted. As illustrated in FIG. 24, the power amplifier 71 is mounted on the communication module 210. The other structures are the same as those of FIG. 23. Therefore, the explanation of the structures is omitted. When the power amplifier 71 is mounted on the communication module 210, the transmitting terminal 62 is directly connected to an RF transceiver IC. Therefore, the wiring pattern is simplified more.

Figure 25:
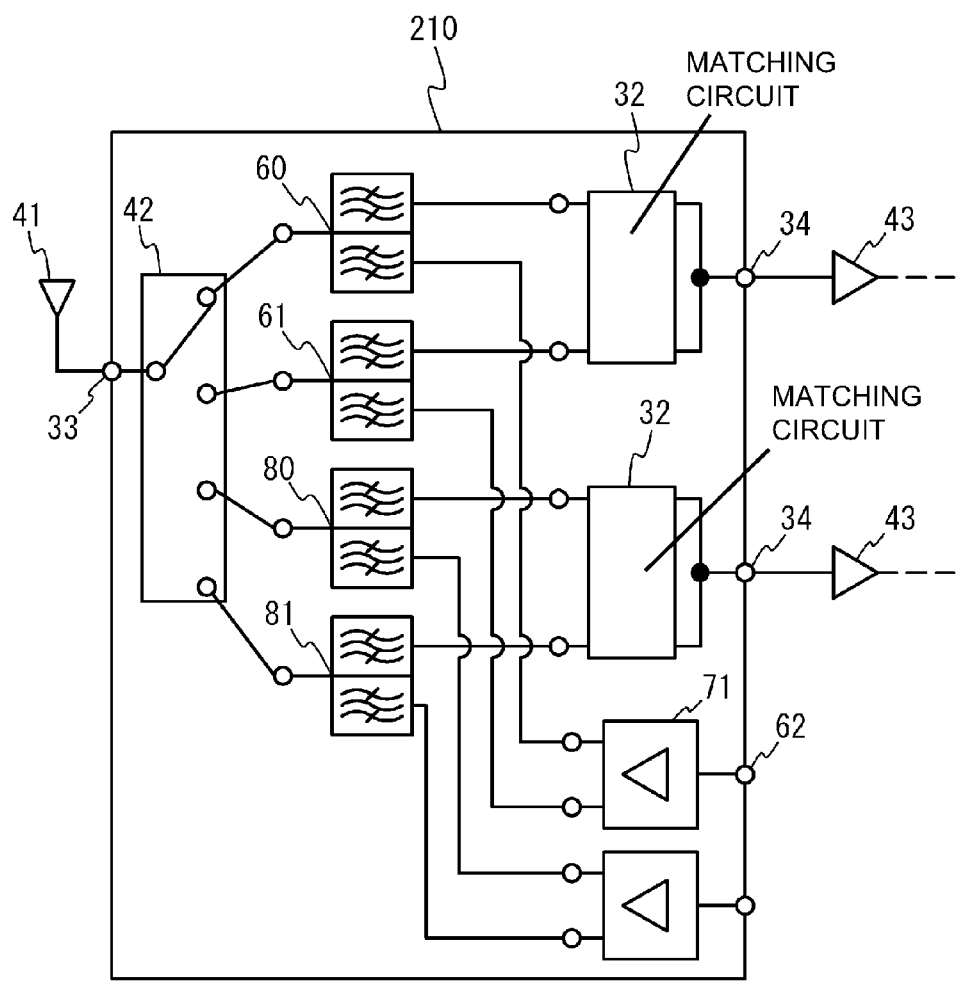
FIG. 25 illustrates an example of a diagram of a wireless communication unit having a communication module in accordance with the first modified embodiment of the second embodiment on which a multi-band power amplifier is mounted.

In FIG. 24, each of the first duplexer 60 through the fourth duplexer 81 has only one power amplifier 71 mounted on the communication module 210. However, the structure is not limited. FIG. 25 illustrates an example of a diagram of a wireless communication unit having the communication module in accordance with the first modified embodiment of the second embodiment on which a multi-band power amplifier is mounted. As illustrated in FIG. 25, a power amplifier for Band 1 and another power amplifier for Band 2 are combined into one power amplifier 71. A power amplifier for Band 5 and another power amplifier for Band 8 are combined into another power amplifier 71. The other structures are the same as those of FIG. 24. Therefore, the explanation of the structures is omitted. As mentioned above, when power amplifiers connected to at least two duplexers of a plurality of duplexers mounted on the communication module 210 are combined into one power amplifier, the number of transmitting terminals may be reduced, and the wiring patter may be simplified more.

In the second embodiment, as explained with reference to FIG. 13 of the first embodiment, a plurality of receiving filters constituting a plurality of duplexers may be a differential filter having two receiving terminals.

In the first embodiment, the receiving filter is an acoustic surface wave filter. In the second embodiment, the transmitting filter and the receiving filter are an acoustic surface wave filter. However, another acoustic wave filter such as an FBAR (Film Bulk Acoustic Resonator) filter, a love wave filter or an acoustic boundary filter may be used instead of the acoustic surface wave filter. The receiving filter and the transmitting filter may be constituted of a filter other than the acoustic wave filter. It is preferable that the receiving filter and the transmitting filter are the acoustic wave filter in view of structuring an economical and small communication module having preferable characteristics.

In the first embodiment and the second embodiment, the frequency bands of the Band 1, the Band 2, the Band 5 and the Band 8 are covered. However, other frequency bands may be covered.

The present invention is not limited to the specifically described embodiments, but other embodiments and variations may be made without departing from the scope of the claimed invention.

What is claimed is:

1. A communication module comprising:
a plurality of receiving filters that are connected between an antenna terminal and a receiving terminal and have a receive band different from each other; and
a passive circuit that is commonly connected to at least two of the plurality of receiving filters, that is connected between said at least two of the plurality of receiving filters and the receiving terminal and that makes a receive band of one of said at least two of the plurality of receiving filters suppressed when making another receive band of said at least two of the plurality of receiving filters transitable,
wherein the receiving terminal of said at least two of the plurality of receiving filters is commonalized into a single receive terminal through the passive circuit.

2. The communication module as claimed in claim 1, further comprising a plurality of transmitting filters that are connected between the antenna terminal and a transmitting terminal and have a transmit band different from each other,
wherein the plurality of receiving filters and the plurality of transmitting filters constitute a plurality of duplexers.

3. The communication module as claimed in claim 1, wherein:
the passive circuit is commonly connected to receiving filters having adjacent receive bands of the plurality of the receiving filters; and
receiving terminals of the receiving filters having the adjacent receive bands are commonalized through the passive circuit.

4. The communication module as claimed in claim 1, wherein the passive circuit includes inductors connected in parallel.

5. The communication module as claimed in claim 1, wherein the plurality of receiving filters are a differential filter having two receiving terminals.

6. The communication module as claimed in claim 1, wherein the receiving filter is an acoustic wave filter.

7. The communication module as claimed in claim 1, wherein the plurality of receiving filters are connected to an antenna through the antenna terminal and connected to a receiving circuit through the receiving terminal.

* * * * *